Patented Apr. 23, 1940

2,197,843

UNITED STATES PATENT OFFICE 2,197,843

PROCESS OF IMPERMEABILIZING, TIGHTENING, OR CONSOLIDATING GROUNDS AND OTHER EARTHY AND STONY MASSES AND STRUCTURES

Gerrit Hendrik van Leeuwen, Amsterdam, Netherlands

No Drawing. Application September 18, 1936, Serial No. 101,426. In the Netherlands October 7, 1935

2 Claims. (Cl. 61—36)

The invention concerns a process for improving the cohesion of and for impermeabilizing and consolidating grounds and other earthy masses, such as subsoil sand or gravel layers, natural and artificial rocks, masonry or concrete structures, stone dumpings, pile works and the like, by filling up and tightening the voids, cavities, fissures and suchlike interruptions of the mass. The present process may be applied, for example, for providing screens impervious or substantially impervious to water and gases in porous and water-bearing soils, tightening seeping dikes, tunnels or cellar walls, consolidating loose soils, such as those for foundations or dike bodies, fixing masses of bog, river beds or shifting sands, tightening cracks and fissures in rock formations, sealing joints in stone-settings and concrete, filling up and uniting stone-dumpings either before, during or after construction, sealing wells or bore-hole walls, such as in the winning of petroleum oil.

It is already known for the said purposes to treat the ground or other mass with impregnating agents of various kinds, such as aqueous bitumen dispersions, cement or clay suspensions and precipitate-forming chemicals.

The process according to the invention consists in supplying into the voids of the masses to be treated a substance which is capable of swelling through a solvating agent, the particles of which substance are coated with a substance repelling the solvating agent, the swelling of the said particles being effected in the mass under treatment by attracting, or absorbing, or combining with, or wetting by the said solvating agent.

Where the solvating agent consists of water or an aqueous solution or dispersion, the swellable substance may comprise either inorganic or organic hydrophile colloids. Among inorganic hydrophile colloids that may be used are the more or less colloidal kinds of clays, hydroxides of polyvalent metals, silicic acid, aluminates or other salts capable of swelling with water or of forming liquid crystals. Among organic hydrophile colloids that may be used are polysaccharides, such as cellulose or starch, gum arabic, agar-agar, lipoides, proteins, such as casein or albumen, organic dyestuffs and the like. Where, however, the solvating agent consists of organic liquids, such as oils, hydrocarbons, chlorinated hydrocarbons, alcohols, carbon disulphide and the like, then the swellable substance may comprise, for instance, rubber, balata, shellac, drying oil polymerization products, factis, nitro-cellulose, acetyl cellulose, soaps and the like which are termed hereinafter in this connection as "oleophile" colloids.

The substances repelling the solvating agent, such as water, which are to be used in combination with hydrophile colloids, are particularly oils, such as mineral oils, oil fractions and residues, tar oils and the like. Such repellent substances are indicated hereinafter as "hydrophobic." In the case of solvating agents consisting of organic liquids such as oils, which are used in conjunction with oleophile colloids as above explained, the substance repelling the solvating agent will be an "oleophobic" substance in most instances water or an aqueous liquid.

The process according to the invention can be carried out in different ways and with the use of various substances, according to the prevailing conditions and the effect to be obtained. Some embodiments of the invention are described hereinafter more in detail.

The swellable substance, for instance, a hydrophile colloid, may be suspended in a hydrophobic substance and the said suspension is caused to penetrate, either together with or without the solvating agent, into the object or mass to be treated; similarly use can be made of an oleophile colloid suspended in an oleophobic substance and applied either together with or without the solvating agent.

The particles of the hydrophile or oleophile colloid may also be coated only with a thin film, such as an adsorption film, of a hydrophobic or oleophobic substance, in which case a carrier or suspending agent is required, which at the same time may act as the solvating agent.

Further, the above embodiments may be combined, when, for instance, the hydrophobic substance going with the hydrophile colloid is the solvating agent for the oleophile colloid, and/or the oleophobic substance going with the oleophile colloid is the solvating agent for the hydrophile colloid.

The properties of the hydrophobic substance, when using a hydrophile colloid, or the properties of the oleophobic substance, when using an oleophile colloid, render it possible to control the rate of solvation. This control may be effected, for instance, by a suitable selection as to the nature and quantity of the hydrophobic or oleophobic substance, in connection with the nature and quantity of the respective hydrophile or oleophile colloid, and moreover the rate and degree of swelling can be varied by a suitable control of the acidity and the polarity of the substances used, which properties may be altered, if desired, by added substances.

In a special embodiment the hydrophile or oleophile colloid may be formed during the penetration of the treating agents into the mass under treatment, in which case the rate of formation of the colloid may also serve as a controllable factor in the working of the process.

The treating agents according to the invention may be applied according to the processes generally used for introducing the known impregnating agents into earthy or stony masses. As a rule the treating agent or agents may be caused to penetrate into the mass to be treated by means of pipes, so that a proper impregnation is effected at the required place, whereby the desired impermeabilization or consolidation is produced.

The treating agents may be injected or pumped in under normal or increased pressure, the pressure applied being, if desired, so high as to produce a widening of the voids with a view to ensuring a more efficient penetration of the liquids. The mass to be treated may also be subjected, either beforehand or simultaneously, to a separate treatment for altering its structure or the chemical constitution of the material to be impregnated, for example by injecting suitable liquids or gases, or by washing out some soil components or removing them in another manner.

The process according to the invention may, if desired, be combined with other known consolidating and impermeabilizing processes, such as the application of bitumen dispersions, cement or clay suspensions, or chemicals which by mutual reaction form voluminous precipitates. More particularly, the practicability of said known processes may be improved by combining them with the present process. For instance, in carrying out the so-called "silicatization" process, according to which consolidation and impermeabilization is produced by the separate injection of solutions of aluminium sulphate or calcium chloride, and waterglass, as a rule clogging up immediately occurs at the place of introduction, owing to rapid precipitation. This drawback may be avoided and the uniform impregnation promoted, if at least one of the mutually reacting chemicals, if desired in aqueous solution, is suspended in a hydrophobic or an oleophobic substance (as the case maybe) or coated with an adsorption film of the latter.

The process according to the invention may also be carried out by successively injecting mixtures showing different rates of solvation; this may be advantageous, for instance, in those cases where flushing away of the injected liquids by running water, such as by the ground water, is to be feared.

In some cases only a temporary tightening or consolidation may be aimed at, which according to the invention may be achieved, for instance, by using indefinitely swellable substances, such as gums or proteins, which after some time are washed out again by water, or organic swellable substances which are liable to decay or lose their structure by biological, chemical or other actions.

In the following examples some special embodiments of the invention are described, although the application of the invention is not restricted to these examples. All the percentages and ratios are by weight.

*Example 1*

A colloidal clay, such as bentonite in substantially dry condition, is coated with a film consisting of about ⅕ of its weight of an extract obtained in the treatment of kerosene with liquid sulphur dioxide (commony referred to as Edeleanu extract). The clay thus coated is then suspended in a 5-fold quantity of water. The said mixture is injected at a suitable depth into a sand soil by means of pipes drilled at suitable distances from one another. As a result of the slow, progressive swelling of the oil-coated clay particles owing to the adsorption of water, a coherent mass impervious to water is produced.

The swelling of the clay in the mixture can, if desired, be still further retarded by adding to the above named extract a strongly water-repellent substance, such as anthracene oil, and/or by acidifying the water. On the other hand the swelling of the clay can be promoted by adding to the said extract a less water-repellent substance, such as gasoline, and/or by alkalizing the water, or by adding a soluble substance, such as alcohol, to the said extract or to the water.

*Example 2*

A 20% suspension of gelatine in gas oil is caused to penetrate into a porous concrete quay wall; the water contained in the concrete produces swelling of the gelatine, as a result of which the concrete is rendered impervious.

*Example 3*

With a view to consolidating the core of a railway dike, consisting of coarse sand and gravel, sets of two concentrical pipes are drilled into the dike body at suitable distances. Through the outer pipe is injected an aqueous dispersion of casein (the casein having first been moistened by the addition of 10% of a lubricating oil fraction rich in aromatics) and simultaneously a 0.5% soda lye is injected through the inner pipe. If pure water were to be used as the solvating agent, the rate and degree of swelling of the casein would be too low, while with alkaline water a considerable acceleration and increase of the swelling is achieved.

*Example 4*

For fixing a river bed consisting of sand, the bed is covered in instalments by a caisson- or bell-shaped appliance, the edge of which is allowed to sink to a certain depth into the sand. A mixture consisting of one part of rubber latex and four parts of a mixture of 80% kerosene and 20% benzene, is pumped into this bell on top of the sand. Such a quantity of this mixture is applied as to produce an impregnation down to some decimetres below the surface of the river bed. Swelling is caused by the gradual absorption of the oil by the rubber particles. If desired, vulcanizing agents, accelerators, fillers, etc. may be added to the mixture.

*Example 5*

The cavities existing underneath a sluice with wooden foundation are filled up by injecting simultaneously but separately, on the one hand a mixture of 100 parts of Portland cement, clay or the like and 50 parts of a petroleum residue thinned to a just pumpable consistency by means of gas oil, and on the other hand 20 parts of a rubber latex diluted to 20% rubber content, or of a 20% aqueous dispersion if iron naphthenate, aluminium palmitate or the like.

If desired, instead of applying the above compositions separately, also a previously prepared mixture of 100 parts cement, clay or the like, 50 parts petroleum residue thinned with gas oil and 20 parts of a 20% rubber latex or of a 20% aqueous dispersion of iron naphthenate aluminium palmitate or the like, may be injected.

By first adding 1% of casein to the latex the swelling of the mass can be retarded.

Example 6

The joints of a breakwater consisting of piled-up, loose granite blocks, and the hollow spaces in the stone dumping provided at the base of the breakwater on the sea bottom are filled up, if desired by injection through a series of pipes, with a mixture of 10 parts of rubber latex and of a dispersion prepared by dispersing 15 parts of bitumen diluted with 15 parts of creosote oil in 200 parts of a 0.3% aqueous soap solution, to which dispersion 100 parts of a filler, such as finely ground stone powder, barytes, clinker or the like, are added.

Example 7

A water-bearing gravel layer is treated by simultaneously but separately injecting through pipes in the proportion 1 : 1 on the one hand a 10% colophony solution in a gasoline rich in aromatics, and on the other hand a 5% aqueous aluminium chloride solution. The acids contained in the colophony are converted into aluminium salts, which swell by absorbing gasoline.

Example 8

In order to cover the bank of a swiftly-flowing river with a coherent stone setting use is made of equal parts of gravel and sand, to which 10% of a 20% rubber latex and 30% of an extract obtained in the treatment of spindle oil with liquid sulphur dioxide, are added. The said mixture constitutes a readily pourable mass, which is applied with the aid of gutters on the stone setting and allowed to sink onto the bank and the river bottom so as to produce a watertight protective covering.

Example 9

In order to consolidate the base of a dune, pipes are drilled into the sand at a shallow depth, and a mixture of one part of finely powdered aluminium sulphate, suspended in two parts of spindle oil, and five parts of a 20% waterglass solution is injected through these pipes. Owing to the coating of the aluminium sulphate with spindle oil, the precipitation of aluminium silicate proceeds so slowly that a uniform tightening and consolidation of the sand can be obtained over a considerable depth and width of injection.

I claim:

1. A process for improving the cohesion of and for impermeabilizing and consolidating grounds and other earthy and stony masses and structures, comprising impregnating the earthy masses with a hydrophile colloid and an oleophile colloid in the presence of solvating agents adapted to swell the same, the hydrophile colloid being surrounded, during its introduction into the earthy masses, by a hydrophobic substance which inhibits the swelling of the hydrophile colloid and provides a solvating agent for the oleophile colloid.

2. A process for improving the cohesion of and for impermeabilizing and consolidating grounds and other earthy and stony masses and structures, comprising impregnating the earthy masses with a hydrophile colloid and an oleophile colloid in the presence of solvating agents adapted to swell the same, the oleophile colloid being surrounded, during its introduction into the earthy masses, by an oleophobic substance which inhibits the swelling of the oleophile colloid and provides a solvating agent for the hydrophile colloid.

GERRIT HENDRIK van LEEUWEN.